(No Model.) 3 Sheets—Sheet 1.
J. W. RAY.
ENGINE SHAFT ROTATION INDICATOR.
No. 526,259. Patented Sept. 18, 1894.
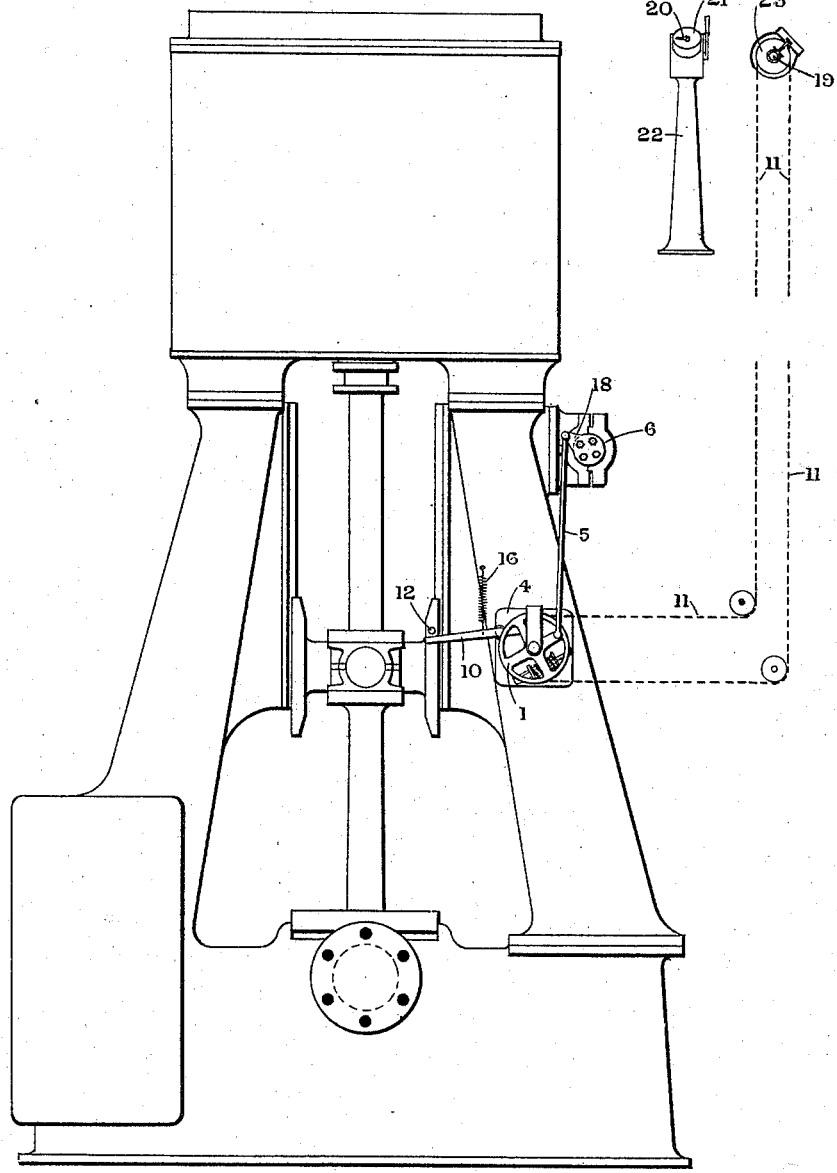
Attest
Walter Maltsu
Wm. T. Hall
Inventor
John William Ray
by Ellis Spear
Atty.

(No Model.)  3 Sheets—Sheet 2.
J. W. RAY.
ENGINE SHAFT ROTATION INDICATOR.
No. 526,259. Patented Sept. 18, 1894.
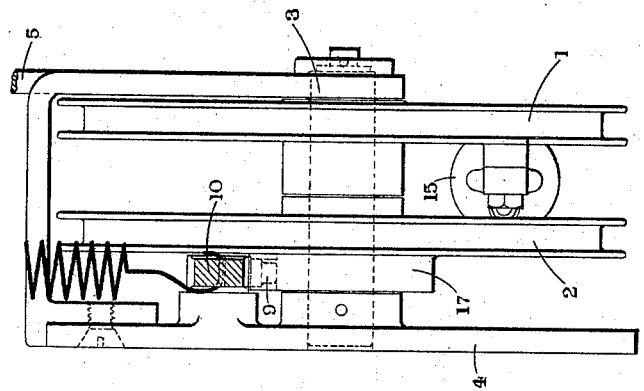
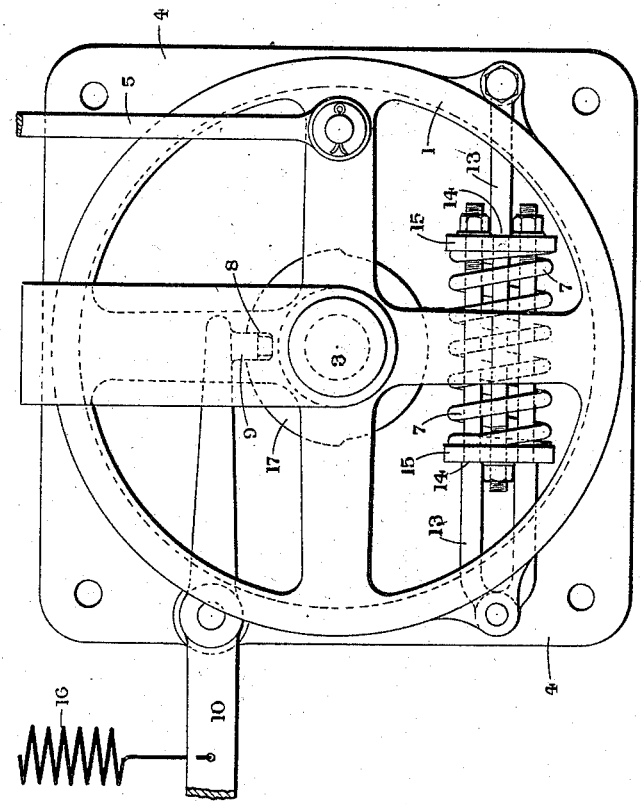
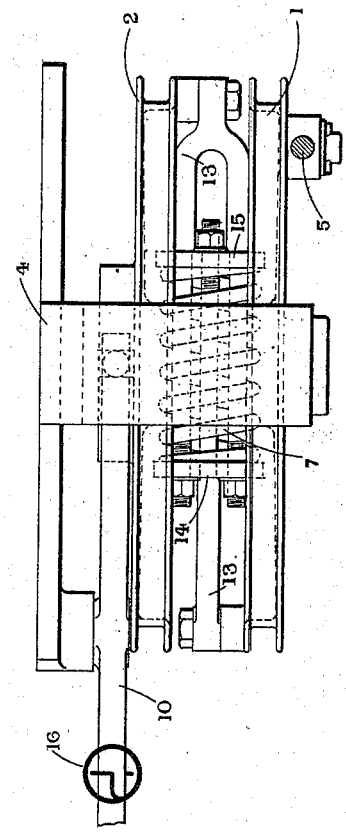
Attest
Inventor
John William Ray

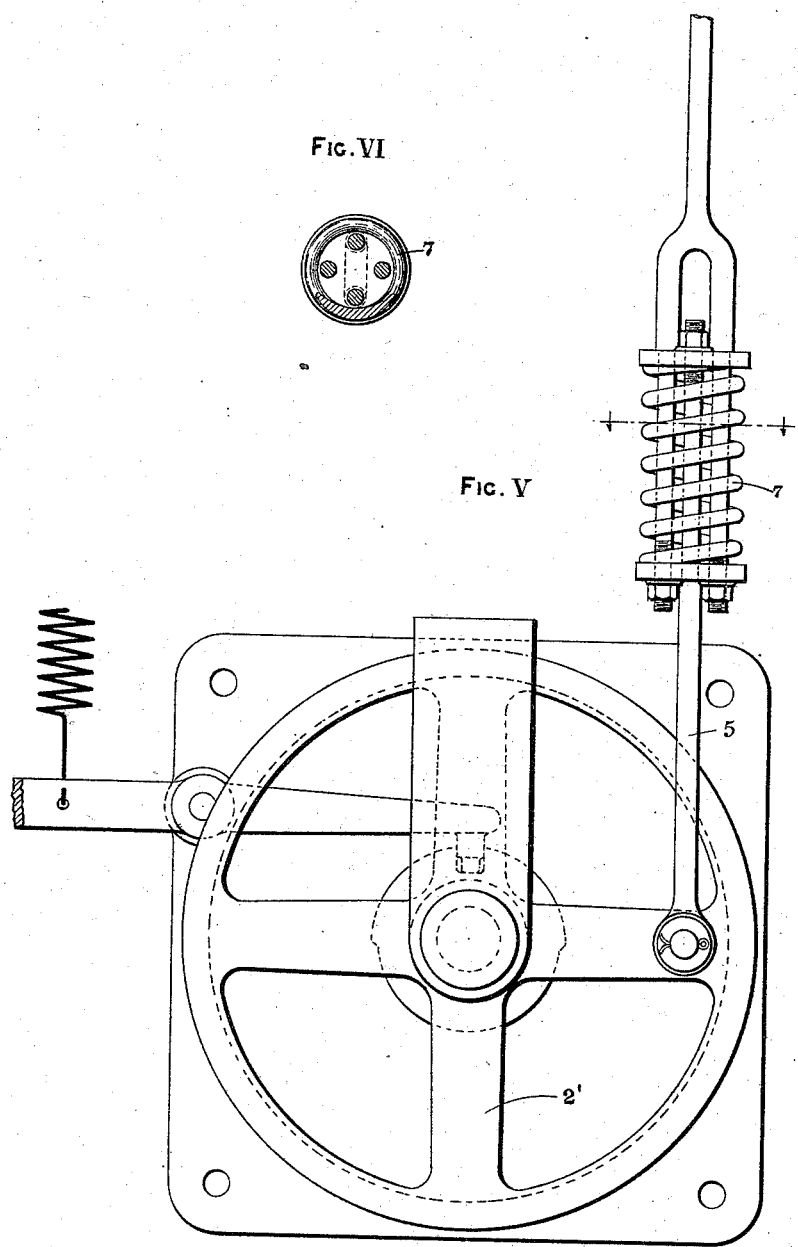

UNITED STATES PATENT OFFICE.

JOHN W. RAY, OF LIVERPOOL, ENGLAND.

ENGINE-SHAFT-ROTATION INDICATOR.

SPECIFICATION forming part of Letters Patent No. 526,259, dated September 18, 1894.

Application filed March 5, 1894. Serial No. 502,392. (No model.)

*To all whom it may concern:*

Be it known that I, JOHN WILLIAM RAY, a subject of the Queen of Great Britain, residing in Liverpool, in the county of Lancaster, England, have invented certain new and useful Improvements in Apparatus for Indicating the Direction of Rotation of Engines, of which the following is a specification.

This invention relates to that class of apparatus used chiefly on board ship to indicate on deck the direction of rotation of the main engines. Such apparatus constructed according to my invention, consists broadly of a device whereby the angular movement of the weigh-shaft of the reversing gear is indicated on the bridge or other desired place, but the arrangement is such that the movement of the weigh-shaft from mid-position is not indicated unless the engines actually begin to rotate in the meantime.

My invention therefore has this advantage over the usual construction:—that the mere movement of the weigh-shaft alone is insufficient to give the indication unless the engines are in motion, and it is consequently impossible under the ordinary working conditions for my apparatus to indicate a direction of rotation when the engines are stationary, a defect common to most forms of indicators of this class.

In the accompanying drawings which illustrate my invention,—Figure I is an elevation of the general arrangement. Fig. II is an elevation, Fig. III a plan and Fig. IV an end elevation of the main portion of the mechanism, and Fig. V is an elevation of a modification, Fig. VI being a fragmentary section on the line A. A. of Fig. V. Fig. VII is a detail view.

Throughout the drawings the same parts are indicated by the same reference figures, and in the case of the section, the direction in which it is viewed, is indicated by the small arrows placed adjacent to the letters denoting the plane of section.

From an inspection of Figs. I to IV it will be seen that my invention comprises two wheels or pulleys 1 and 2, mounted concentrically on a stud 3 carried by a frame 4. The wheel 1 is positively connected by a rod 5 to the lever 18 on the weigh-shaft 6 and has therefore an angular motion corresponding to the latter. The wheel 1 is also connected to the wheel 2 by the interposed spiral spring 7, the spring connections being such (as will be more fully described) that any angular movement of the one wheel relatively to the other produces a compression of the spiral spring. The pulley 2 has a notch 8 formed in the periphery of its boss 17 into which a projection 9 on the detent lever 10 normally engages and so holds the wheel 2 stationary. An endless chain 11 connects the wheel 2 to a spindle 19 which operates the index hand 20 of the indicator on the bridge. Supposing now that the reversing gear is moved, in response to an order, from mid position to say the ahead position, the wheel 1 will be moved to a corresponding position, but the wheel 2 being held as described will not be able to follow, with the result that the spiral spring will be compressed and tend to move wheel 2 to a position corresponding to wheel 1. The engine will now begin to revolve and as soon as the piston crosshead is in its lowest position, as shown in Fig. I, the releasing pin 12 thereon will operate the detent lever 10 in opposition to the spring 16, lifting the projection 9 out of the notch 8, and so allow the spiral spring to rotate the wheel 2 into a position corresponding to that of the wheel 1, and as the latter is connected to the weigh-shaft and the former by the chain 11 to the index hand 20 of the indicator, the said hand will, as soon as the engines begin to move, but not before, take up a position corresponding to the angular position of the weigh-shaft which latter of course determines the direction of rotation.

The boss 17 of the wheel 2 has its periphery, in the vicinity of the notch, formed eccentric to the center of rotation, so that when the wheel is on either side of mid position this eccentric periphery lifts the projection 9 so that the tail end of the detent lever 10 is clear of the releasing pin 12 on the cross head as the latter reciprocates. Should the engines now be reversed or stopped the weigh shaft and consequently the wheels 1 and 2 will pass through their mid position the wheel 2 being held in this position by the projection 9 after which the action will be similar to that described. The projection 9 is made of smaller dimensions near its extremity so that it may engage with the notch before the wheel 2 actually comes into mid position. This is to provide for the case where the weigh shaft of the reversing gear is not brought exactly into mid position. The connections of the spiral spring whereby any relative movement between the wheels 1 and 2 produces compression of the spring are as follows: Each of the wheels is provided with a forked connecting rod 13. Each prong of each rod is reduced in diameter from the end to a shoulder 14. Two sliding pieces 15 having four holes at right angles pass over each prong of each rod (see Fig. VI) thus locating the prongs of the rods at right angles. The spiral spring is interposed between the sliding pieces 15 which are limited in their travel by the shoulders 14 and nuts and washers on the ends of the prongs, and an inspection of the figure will show that, whether the rods 13 approach toward, or recede from each other, as a result of the movement of the wheel 1 relatively to the wheel 2, the spiral spring is compressed. The object of arranging the spring in this way is to obviate the loss of motion which would result if the spring were alternately extended and compressed. In the arrangement shown an initial compression can be given greater than that required to overcome frictional resistance or inertia.

Figs. V and VI show a modification in which there is but one wheel, 2', the spiral spring being interposed between this wheel and the weigh shaft. The construction in other respects and the action are identical with what has already been described.

The chain 11 is endless and is attached to the wheel 2 and is led as directly as possible to the indicator on the ship's deck which is preferably an additional dial 21 placed athwartships on the transmitting instrument 22, the chain 11 operating a wheel 23 in the instrument whose movement is transmitted to the index hand 20 of the indicating dial by bevel wheels.

Having fully described my invention, what I claim, and desire to secure by Letters Patent, is—

1. In combination, the weigh-shaft of the reversing gear of an engine, a movable index hand, an elastic connection between the index hand and the weigh-shaft, a detent lever adapted to hold the said index hand stationary, and a releasing pin carried by a part of the engine which moves as the engine rotates, and adapted to disengage the detent lever, substantially as described.

2. In combination, the weigh-shaft of the reversing gear of an engine, an index hand moving over an index scale, a rotatable piece positively connected to the index hand and elastically connected to the weigh-shaft, a detent lever adapted to hold the said rotatable piece in mid position, and a releasing pin carried by a part of the engine which moves as the engine rotates, and adapted to disengage the detent lever, substantially as described.

3. In combination, the weigh-shaft, the index hand, the rotatable piece positively connected to the index hand and elastically connected to the weigh shaft, the detent lever, the releasing pin, and an eccentric piece connected to the said rotatable piece and moving therewith and adapted, when the rotatable piece is not in mid position, to move the detent lever clear of the releasing pin, substantially as described.

4. In combination, the weigh-shaft of the reversing gear of an engine, an index hand moving over an index scale, a rotatable piece positively connected to the weigh-shaft, a second rotatable piece positively connected to the index hand, an elastic connection between the first and second rotatable pieces, a detent lever adapted to hold the second rotatable piece in mid position, and a releasing pin carried by a part of the engine which moves when the engine rotates, and adapted to release the detent lever, substantially as described.

5. In combination with the weigh-shaft and index hand, the first and second rotatable pieces interposed between said shaft and hand, the detent lever and releasing pin, an eccentric piece connected to the second rotatable piece and moving therewith, and adapted to move the detent lever clear of the releasing pin, substantially as described.

6. In combination, the wheel 1 connected to the lever 18 on the weigh-shaft 6, the wheel 2 connected to the index hand 20 and having a notched eccentric boss 17, the spiral spring 7 connecting wheels 1 and 2, the detent lever 10 and the releasing pin 12 on the piston cross-head, substantially as described and illustrated.

7. In combination a weigh shaft and index hand elastically connected thereto, a detent lever mounted upon a stationary part of the frame a projection 9 thereon of smaller dimensions at the point than at the root, the point of which is adapted to engage in a notch positively connected to the index hand, when the latter is near its mid position, substantially as described and illustrated.

8. In combination with the weigh shaft of the reversing gear of an engine, an index hand, an initially compressed spiral spring forming elastic connection between said shaft and hand, a detent lever adapted to retain said index hand against movement and a pin carried by the moving parts of the engine for operating said detent lever, substantially as described.

9. In combination with the weigh shaft, the index hand, and the elastic connections between said weigh shaft and hand including the forked rods connected to said shaft and hand and having their forked ends overlapping, and the coiled spring encircling said forked ends, substantially as described.

10. In combination with the weigh shaft, the wheel 1 connected thereto, the wheel 2 elastically connected to said wheel 1, the index hand, and the elastic connection from said wheel 2 to the index hand composing the forked rods having overlapping ends and the spring encircling said ends, substantially as described.

In testimony whereof I have hereunto set my hand in the presence of two subscribing witnesses.

JOHN W. RAY.

Witnesses:
 ROBT. A. SLOAN,
 J. E. LLOYD BARNES,
*Patent Agents, 26 Castle Street, Liverpool.*